June 2, 1936. G. A. LYON 2,042,949
TIRE COVER CONSTRUCTION
Filed March 2, 1931 2 Sheets-Sheet 1
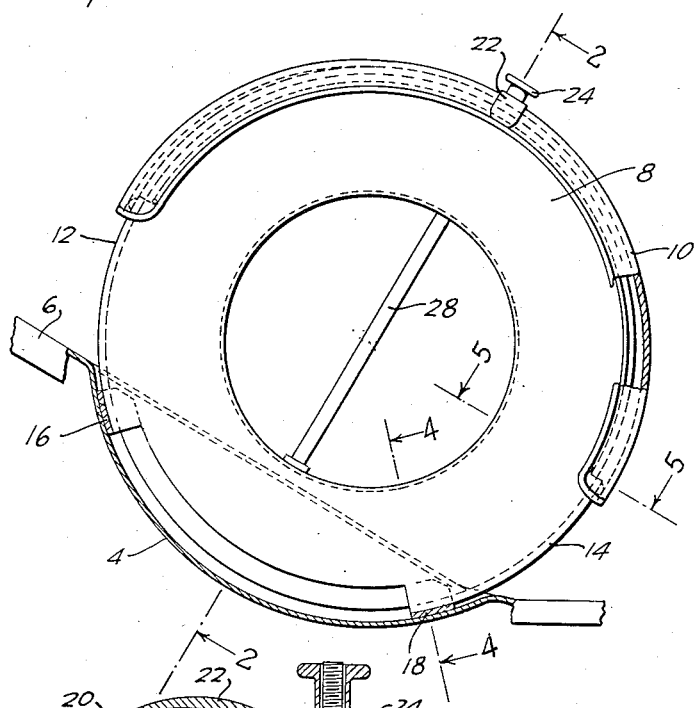
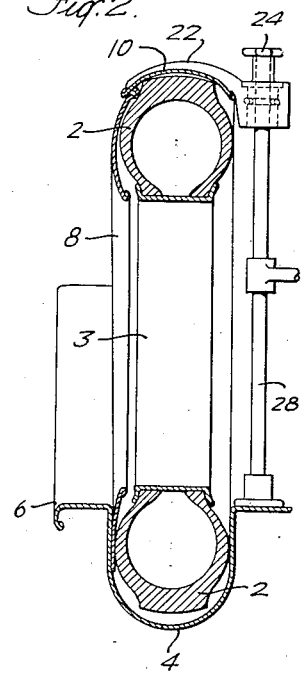
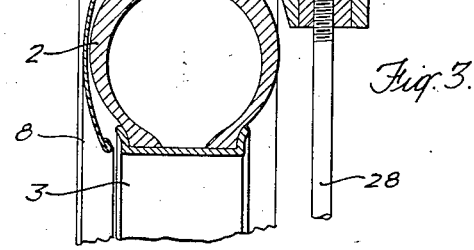
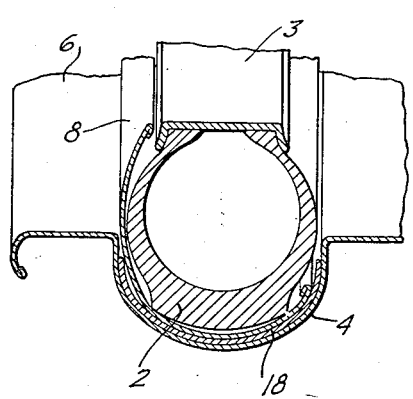
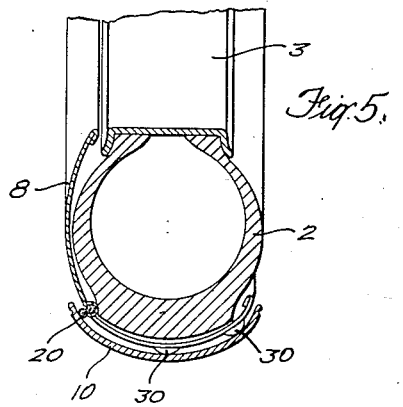
INVENTOR
GEORGE ALBERT LYON
BY Charles I. Sills
ATTORNEYS

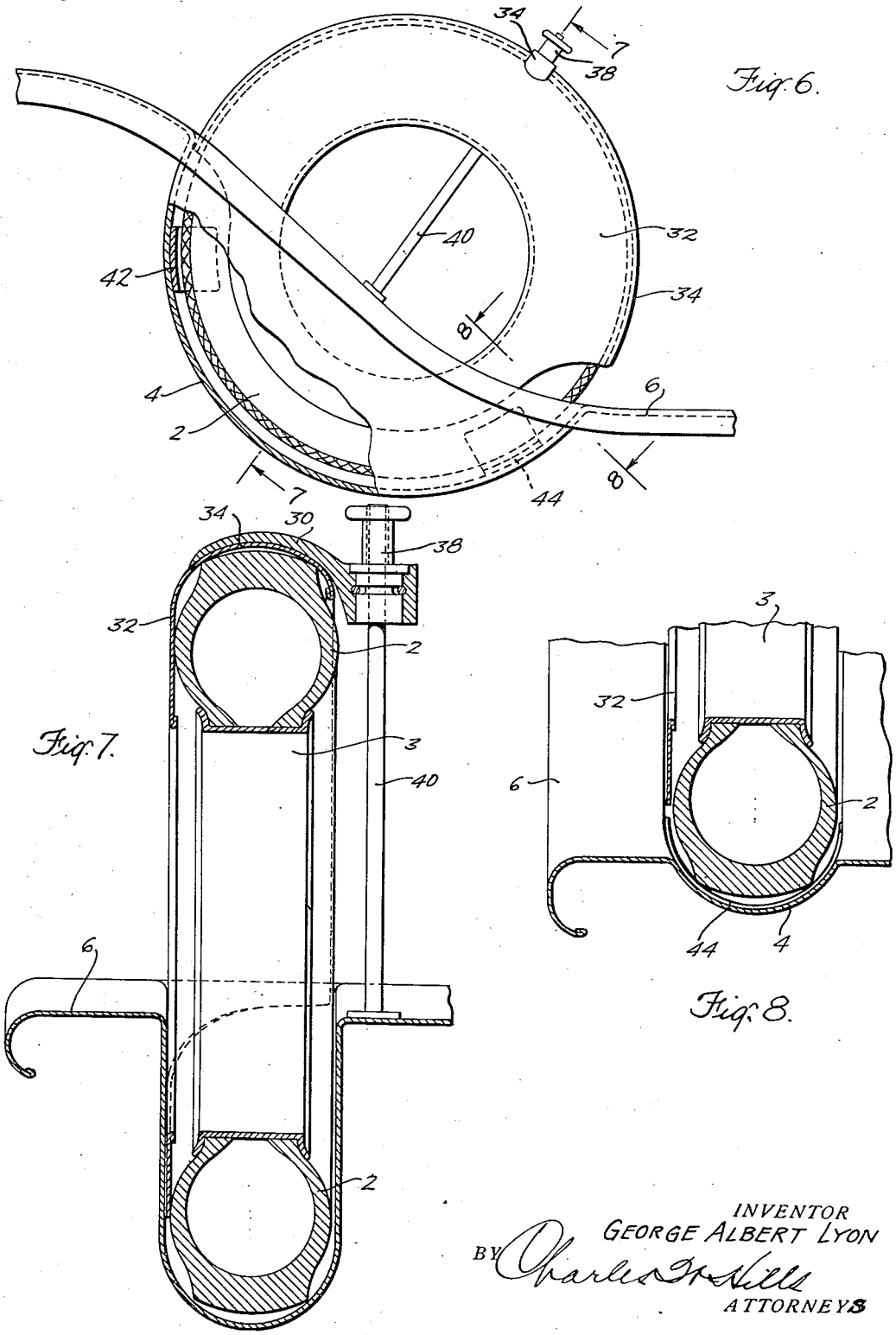

Patented June 2, 1936

2,042,949

UNITED STATES PATENT OFFICE 2,042,949

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,339

12 Claims. (Cl. 224—29)

This invention relates to cover devices for covering the spare tires of automobiles, and more particularly to tire covering devices of the type comprising an enclosing casing of metal or other relatively stiff material.

The invention is particularly designed to be applied to a tire supported in a well in the fender of an automobile.

Certain of the important objects of the present invention are to improve the construction and mode of operation of devices of the above type for covering the spare tires of automobiles, and to produce a device of this character which will form a protective cover of attractive appearance for a spare tire supported in the fender well, and which may be readily applied to, and removed from the tire.

Another important object of the invention is to produce a novel and improved construction for covering a spare tire mounted in a fender well, which will operate to hold the tire securely in position in the well.

With these and other objects in view, the invention consists in the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings, Fig. 1 is a view in side elevation, illustrating a construction embodying the invention;

Fig. 2 is a sectional view taken substantially on the line 2—2 of Fig. 1;

Fig. 3 is a sectional view of certain details of Fig. 1;

Fig. 4 is a detail sectional view taken substantially on the line 4—4 of Fig. 1;

Fig. 5 is a detail sectional view taken substantially on the line 5—5 of Fig. 1;

Fig. 6 is a view in side elevation partly in section illustrating a modified construction;

Fig. 7 is a sectional view taken substantially on the line 7—7 of Fig. 6; and

Fig. 8 is a detail sectional view taken substantially on the line 8—8 of Fig. 6.

The invention is illustrated in this application as applied to a tire 2 mounted on a rim 3 and engaging in a recess or well 4 in the fender 6 of an automobile. The structure illustrated serves the dual function of a "hold-down" device for holding the tire in the fender well and a cover for the tire. In the form of the invention shown in Figs. 1 to 5, inclusive, the construction comprises a side cover member 8 for covering one side of a tire and a peripheral cover member 10 for covering a portion of the periphery of the tire. The side cover section 8 consists of an annular plate of relatively stiff sheet meterial, preferably sheet metal, constructed to extend from that part of the side wall of the tire adjacent the tread inwardly, toward the axis of the tire, to the rim. This section is concavo-convex in cross-section and is applied to the tire with its concave side adjacent the tire to receive the bulge in the side wall thereof, the section fitting over the side wall, as shown in Figs. 2, 3, 4, and 5. The section 8, if desired, may be formed to extend from the periphery of the tire to the axis of the tire and rim.

As shown in Fig. 1, the section 8 is provided with extensions 12 and 14 shaped to project laterally from the peripheral portion of the body of said section across the periphery of the tire. These extensions are made concavo-convex in cross section, as shown in Fig. 4, and are arranged to receive the periphery of the tire in the recesses on the inside thereof. Both the extensions 12 and 14 preferably are arranged upon one side of a diametrical line across the section 8, as shown in Fig. 1. Between the said extensions, the outer marginal portion of the section 8 is cut away so that the section terminates some distance inside the tire tread, as shown in Figs. 1 and 2.

The section 8 of the tire cover is applied to the tire before the tire is placed in the fender well. The tire, with the section 8 applied thereto, is then placed in the fender well with said section occupying substantially the position shown in Figs. 1 and 2. As shown in these figures, the lower or adjacent portions of the extensions 12 and 14 engage in the fender well at the ends of the well, said extensions projecting some distance above the well. In order to support the tire cover and tire, contact or support members 16 and 18 are secured within the fender well and are arranged to be engaged by the extensions 12 and 14 on the side cover section. These contact members preferably consist of flexible sheet material, such as strips of impregnated fabric brake lining laid about the inner surface of the fender well, as shown in Fig. 4, and secured in place in any suitable manner. These contact members constitute two point supports for the tire cover and hold the tire cover and tire out of contact with the fender well at other points.

The section 10 of the tire cover also is made of relatively stiff sheet material, such as sheet metal. This section is preferably constructed to extend substantially half-way about the periphery of the tire, and has a concavo-convex form in cross section so as to fit over the periphery of the tire, the tread portion of the tire engaging in the concavity in the inside of this section. This section is formed to extend transversely across the tread portion of a tire and to project some distance beyond the tread portion at its margins. The section 10 is applied to the tire outside of the side cover section 8 and the marginal portion of the section 10 adjacent the side cover section is arranged to overlap the peripheral portion of the latter section, as clearly shown in the drawings. In order to prevent contact between the sheet material of the sections 10 and 8, a strip 20 of yielding material, such as rubber, is preferably secured to the peripheral portion of the section 8, this strip being engaged by the adjacent overlapping marginal portion of the section 10, as shown in Figs. 2, 3, and 5.

The section 10 is preferably constructed to extend slightly more than half way about the periphery of the tire so that the ends of said section will overlap the extensions 12 and 14 on the section 8. To prevent contact between the sheet material of the sections 8 and 10 at the end portions of the section 10, buttons 30 of yielding material, such as rubber, are mounted on the upper end portions of the extensions 12 and 14 for engagement with the section 10.

The section 10 not only forms a cover for a portion of the periphery of the tire, but also constitutes a "push-down" or a "hold-down" device for holding the tire securely in the fender well. As shown in the drawings, a member 22 is secured to the central portion of the section 10 and within said member 22 is rotatably mounted a nut 24 held in position by a spring ring 26. The nut 24 is arranged to be threaded upon the upper end of a rod 28 secured to the frame of the automobile on the inner side of the fender at a point opposite the central portion of the well and extending obliquely upwardly therefrom in a direction substantially parallel with the central plane of the tire, as shown in Figs. 2 and 3.

In applying the tire cover to the tire, the section 8 and the tire are relatively positioned while the tire and said section are located outside of the fender well. The section 8 is positioned with relation to the tire as shown, with the body of said section engaging the side wall of the tire and with the extensions 12 and 14 extending across the tread and with the tread engaging in the recesses in said extensions. The tire cover and section 8 are then placed in the fender well with the extensions 12 and 14 in engagement with the contact members 16 and 18, as shown in Fig. 1. The section 10 is then placed in position to engage the threaded rod 28 in the nut 24 and the nut is rotated to move the section toward the axis of the tire and rim, the section being located angularly about the rod to engage the tread of the tire, as shown in Figs. 2 and 3. As the nut is turned down, the engagement of the section 10 with the tire forces the tire downwardly against the extensions 12 and 14 on the section 8 and said section is forced down into firm engagement with the contact members 16 and 18. The tire is supported by contact with the extensions 12 and 14 on the section 8 and with the central portion of the section 10.

In removing the cover from the tire, the nut 24 is unscrewed from the rod, thereby disengaging the section 10 from the tire and the tire and section 8 are removed from the fender well. The section 8 may then readily be removed from the tire.

In the construction shown in Figs. 6, 7, and 8, the means for covering respectively the periphery of the tire and the side wall thereof form a unitary structure. When this construction is employed, the fender well 4 is preferably made somewhat deeper than the ordinary well. As shown in these figures, the tire cover comprises an annular side plate or wall 32 having the shape in cross section shown in Fig. 7 for extending over the side wall of the tire, and a semi-annular peripheral portion 34 formed integral with the side plate and having a concavo-convex shape in cross section for extending about the peripheral portion of the tire. The side plate preferably has the shape in elevation, shown in Fig. 6. As shown in this figure, the lower half of the side plate does not extend substantially to the thread, but is cut away so that it terminates some distance inside the tread. The lower part of the side plate is arranged to extend down into the well between the outer side of the tire and the adjacent side wall of the well. Instead of having an annular form, the side plate may extend to the axis of the tire.

To the peripheral portion 34 of the cover is secured a member 36, within which is rotatably mounted a nut 38 having a threaded opening to receive the upper threaded end of a rod 40 secured to the frame of the automobile at the inner side of the fender well; all of which parts have substantially the same construction, arrangement and mode of operation as the corresponding parts shown in Figs. 1, 2, and 3. Within the fender well are mounted two contact members 42 and 44 of substantially the same construction as the contact members 16 and 18 for engagement with the tire and forming two point supports therefor, the tire being held by said contact members out of engagement with the bottom of the fender well at other points.

The tire cover shown in Figs. 6, 7, and 8 may be applied to the tire either before or after the tire has been placed in the fender well. The screwing down of the nut 38 forces the peripheral portion of the tire cover firmly against the tire and also forces the tire against the contact members 42 and 44 so that the tire and cover are held securely in position.

The constructions shown in the drawings not only form satisfactory and efficient cover and "push-down" or "hold-down" devices for inflated tires, but will operate much more effectively than the ordinary "push-down" device in holding deflated tires in position in a fender well, because of the relatively extended surface of the tire engaged by the present "push-down" device. In the present construction the pressure of the "push-down" devices is exerted over an area extending substantially half way about the tire and this area will furnish a strong resistance to the pressure and will not collapse.

In the construction shown, the tire is not only held firmly in the fender well so that it will not be displaced by a movement of the tire in the general direction of the central plane thereof, but the tire is effectively held from lateral movement or vibration.

The present construction is highly ornamental and attractive in appearance and forms an effective covering for the tire, to protect the same from mud and dirt and exposure to the weather and against injury from accidental contacts.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. A tire cover construction for application to a tire supported in a fender well, comprising, in combination, a side cover section for covering one side of the tire, a push-down rod and a cover section arranged to overlap the first section and extend about a portion of the periphery of the tire the second section being mounted on said push-down rod for holding the first section and tire in position in the fender well, and means for moving the latter section along said rod.

2. A device of the class described, comprising, in combination, a side cover member formed to substantially entirely cover one side of a tire, and having parts to extend from one side of the tire across the tire tread, and an arcuate peripheral cover section arranged to extend about a portion of the periphery of the tire intermediate said parts and overlap said member to hold the same in position.

3. A device of the class described, comprising, in combination, a side cover section formed to cover one side of a tire supported on the body of an automobile, a rod mounted on the automobile body and extending substantially parallel with the central plane of the tire, and an arcuate peripheral cover section shaped to cover substantially half of the periphery of the tire and mounted on the rod and movable thereon toward and from the axis of the tire and means for moving the latter section.

4. In combination with an automobile fender well and a standard adjacent the same, a tire cover comprising a one-piece arcuate member for covering a major part of the exposed side wall and tread portions of a spare tire carried in said well, means securing said member to said standard by a swivel connection, said means being threaded to said standard whereby the same may be operated to clamp said member against the tire or remove the same to allow the tire to be removed from the well.

5. In combination with an automobile fender well and a standard adjacent the same, a tire cover comprising a one-piece arcuate member for covering a major part of the exposed side wall and tread portions of a spare tire carried in said well, means securing said member to said standard, said means being threaded to said standard whereby the same may be operated to clamp said member against the tire or remove the same to allow the tire to be removed from the well, said connection being located intermediate the ends of the tread covering portion of said member, whereby a major part of the tread covering portion of the member exerts pressure upon the tire toward the fender well.

6. In combination with an automobile fender well and a standard adjacent the same, a tire cover comprising a one-piece arcuate member for covering a major part of the exposed side wall and tread portions of a spare tire carried in said well, means securing said member to said standard, said means being threaded to said standard whereby the same may be operated to clamp said member against the tire or remove the same to allow the tire to be removed from the well, and means for preventing contact between the well and a tire carried therein.

7. In combination with an automobile fender well and a standard adjacent the same, a tire cover comprising a one-piece arcuate member for covering a major part of the exposed side wall and tread portions of a spare tire carried in said well, means securing said member to said standard, said means being threaded to said standard whereby the same may be operated to clamp said member against the tire or remove the same to allow the tire to be removed from the well, at least one end of the tread covering portion terminating at the mouth of the well.

8. A tire cover construction for application to a tire supported in a fender well comprising, in combination, a semi-circular shaped tire hood, a fender supported post, a sleeve secured to the hood and receiving the upper portion of the post, and stop means on the post and engageable with the sleeve for preventing upward movement of the sleeve on the post.

9. A tire cover construction for application to a tire supported in a fender well comprising, in combination, a semi-circular shaped tire hood, a fender supported post, and means connected between the upper end of said post and said hood for pressing said hood downwardly into proper tire protecting position on said tire.

10. A tire cover construction for application to a tire supported in a fender well comprising, in combination, a semi-circular shaped tire hood of curved convex cross section, a vehicle supported member adjacent said hood, and means connected between said member and a top portion of said hood for forcing said hood downwardly into proper tire protecting position on said tire.

11. In combination, an automobile fender well for receiving a spare tire, a tire cover including a section cooperating with a side wall of the tire and provided with arms for supporting the tire and projecting across the tire tread adjacent the well, anti-rattle means in the well and spacing said section from the fender, a second section overlapping the first section throughout substantially the length of the second section and also overlapping said arms and shaped to shield the exposed portion of the tire tread between said arms, a bracket carried by the fender, a sleeve adjustable on said bracket, and a connection between said sleeve and an intermediate part of the second section, whereby the second section may be bodily adjusted against the tire and the other section in the direction of the deepest part of the well to hold the cover and tire in position against rattling.

12. In combination, an automobile fender well for receiving a spare tire, a tire cover including a section cooperating with a side wall of the tire and provided with arms for supporting the tire and projecting across the tire tread adjacent the well, anti-rattle means in the well and spacing said section from the fender, a second section overlapping the first section throughout substantially the length of the second section and also overlapping said arms and shaped to shield the exposed portion of the tire tread between said arms, a bracket carried by the fender, a sleeve adjustable on said bracket, a connection between said sleeve and an intermediate part of the second section, whereby the second section may be bodily adjusted against the tire and the other section in the direction of the deepest part of the well to hold the cover and tire in position against rattling, and means for cushioning the sections with respect to each other.

GEORGE ALBERT LYON.